June 24, 1941.  R. L. LÉVY  2,247,302
HYDRAULIC REMOTE CONTROL DEVICE
Original Filed Sept. 12, 1938
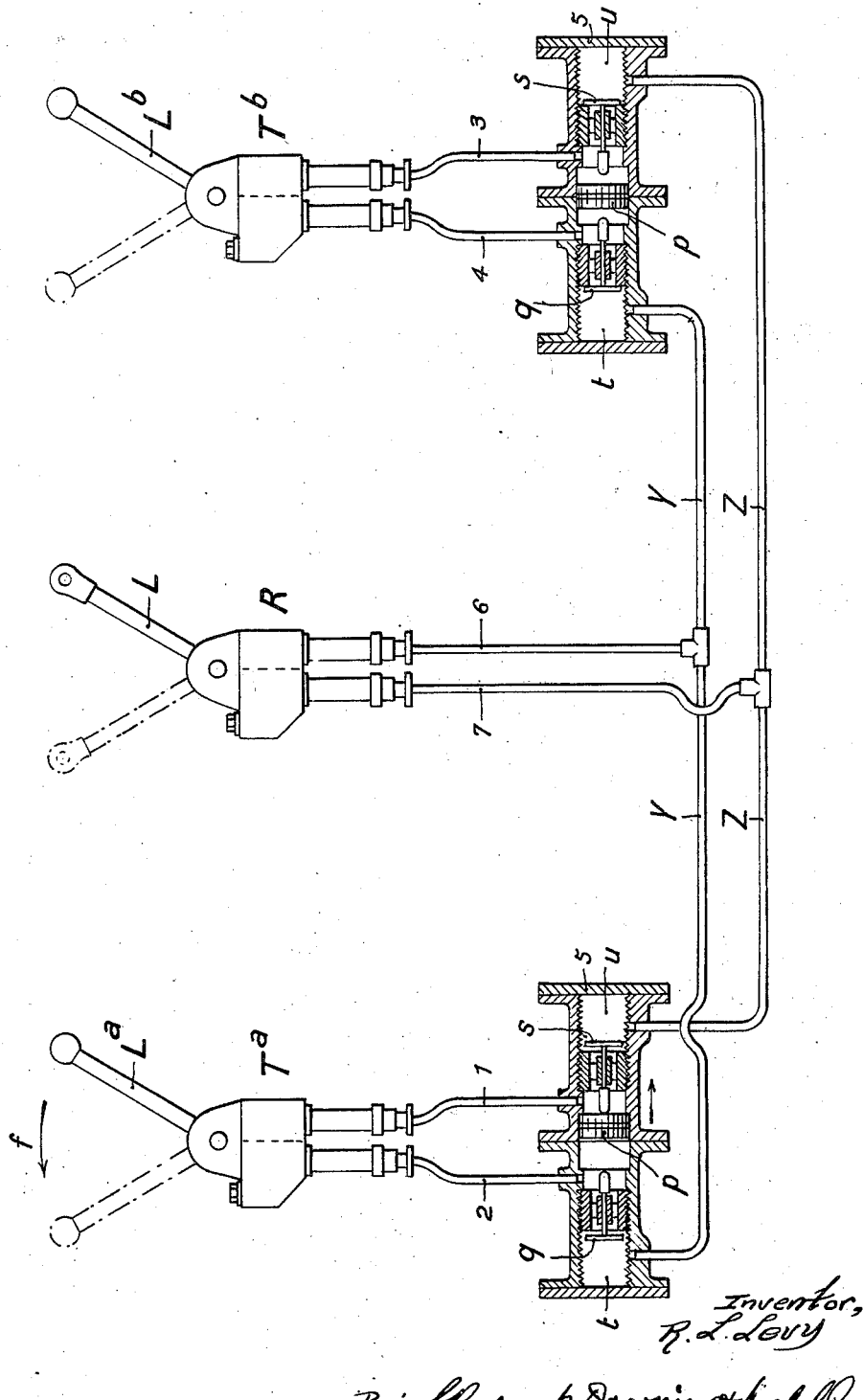
Inventor,
R. L. Lévy
By: Glascock Downing & Seebold
Attys.

Patented June 24, 1941

2,247,302

UNITED STATES PATENT OFFICE 2,247,302

HYDRAULIC REMOTE CONTROL DEVICE

René Lucien Lévy, Paris, France, assignor to Société d'Inventions Aéronautiques et Mecaniques S. I. A. M., Fribourg, Switzerland Original application September 12, 1938, Serial No. 229,637. Divided and this application June 29, 1940, Serial No. 343,398. In France September 29, 1937

1 Claim. (Cl. 60—54.5)

This application is a division of application Ser. No. 229,637, filed Sept. 12, 1938.

The invention relates to hydraulic devices which enable the movement of several or one transmitting members to be reproduced at a distance on a common receiving member.

In practice, it is frequently required to control, at will, a receiving station alternately by means of two or more independent transmitting stations, under such conditions that the control action exerted by any one of said transmitting stations only affects the receiving station and does not exert any influence on the other transmitting stations.

Controls of this type are required in particular on trains driven by automotive cars, in which it has to be possible to control a motor from a front station or from a rear station, according to the direction of circulation of the vehicles.

At present, in such cases, in order to neutralize the station which is not being used for the control, the driver has to actuate cocks interposed on the pipes that connect said station to the motor, or again in other systems, he has to lock a lever or the like of said station.

In order to avoid these manipulations and consequently eliminate the drawbacks that may be involved by their accidental omission, the invention relates to a device which enables a receiving station to be alternately controlled by means of two or more transmitting stations, without the action of any one transmitting station affecting the other transmitting stations.

Said device, which is fitted at the output of each of the transmitting stations, on the two pipes issuing from said station, consists of an irreversibility box. Said box essentially comprises a cylinder containing a floating piston, said pipes opening on either side of said piston, the opposite faces of which are adapted to act respectively on two valves which open in opposite directions, the outer compartments of said valves respectively communicating with the two general pipes which are connected to the other transmitting stations and on which the receiving station is mounted in parallel.

In the example, two transmitting stations $T^a$—$T^b$ have to be able to control a receiving station R alternately, under such conditions that the controlled member L of said receiving station occupies at every instant a homologous position to that of the controlling member, either $L^a$ or $L^b$.

At the output of each of the transmitting stations $T^a$ and $T^b$ an irreversibility box 5—8 is interposed on the pipes 1—2 or 3—4 issuing respectively from said stations.

Each irreversibility box contains a floating piston $p$ which normally occupies a mean position in the box. Valves $q$—$s$ are mounted on corresponding seats which are fixed inside the box, beyond the opening of the pipes 1 and 2 relatively to the centre of the box.

Said valves $q$—$s$ are adapted to open in opposite directions and away from said center.

The extreme compartments $t$—$u$ of the box communicate with the general pipes Y—Z which connect the two transmitting stations to each other and on which the receiving station R is mounted in parallel by means of pipes 6—7.

This device operates as follows:

For example, by acting on the lever $L^a$ in the direction of the arrow $f$, the liquid which is driven into the pipe 2, on the one hand opens the valve $q$ and on the other hand urges the piston $p$ in the direction of the arrow, so that the valve $s$ also opens.

Consequently, on the one hand the liquid which is driven into the pipe 2 can flow through the pipe Y and the branch 6 into the right hand cylinder of the receiver R, so that the controlled lever L reproduces the movements of the lever $L^a$ in a homologous manner.

On the other hand, the liquid which is driven into the left hand cylinder of the receiver R by the actual operation of said receiver, can flow into the compartment $u$ through the pipes 1 and Z, then, the valve $s$ being open, can flow into the pipe 4 and into the right hand cylinder of the transmitting station $T^a$. It will readily be seen that the transmitting station $T^b$ remains inoperative owing to the fact that the liquid which is driven into the pipes Y and Z closes the valves $q$ and $s$ of said station $T^b$. The controlling action of $T^a$ does not therefore exert any influence on $T^b$.

Similarly, the control of the receiving station R by $T^b$ does not exert any influence on $T^a$.

Although the example considered above relates to the case of two transmitting stations associated with a single receiving station, it is obvious that the irreversibility boxes could be applied, with the same results, to systems comprising more than two transmitting stations.

The applications of these irreversible control systems are multiple: for example, the control of the gases for an engine from a plurality of cockpits.

In the case of a single transmitting station, this device provides the irreversibility of the control.

I claim:

A hydraulic device comprising a plurality of transmitting stations, a receiving station, two pipes issuing from each transmitting station and connected to the receiving station, and to the other transmitting stations, an irreversibility box connected to the two pipes of each transmitting station, a floating piston mounted in said box, said two pipes opening on either side of said piston, and two valves respectively actuated by the two opposite faces of said piston, the outer compartments of said valves being connected to the other transmitting stations and to the receiving station.

RENÉ LUCIEN LÉVY.